United States Patent [19]

Nilsson et al.

[11] Patent Number: 5,398,774
[45] Date of Patent: Mar. 21, 1995

[54] END STOP ARRANGEMENT FOR A VEHICLE CABIN

[75] Inventors: Nils Nilsson, Göteborg; Bengt Ljungholm, Angered, both of Sweden

[73] Assignee: AB Volvo, Sweden

[21] Appl. No.: 140,091

[22] PCT Filed: Apr. 30, 1992

[86] PCT No.: PCT/SE92/00290
§ 371 Date: Nov. 2, 1993
§ 102(e) Date: Nov. 2, 1993

[87] PCT Pub. No.: WO92/19484
PCT Pub. Date: Nov. 12, 1992

[30] Foreign Application Priority Data

May 3, 1991 [SE] Sweden ............... 9101327

[51] Int. Cl.⁶ ............................................. B62D 33/067
[52] U.S. Cl. .................................. 180/89.14; 296/190
[58] Field of Search ............... 180/89.13, 89.14, 89.15, 180/89.16, 89.17, 89.18, 89.19, 69.21; 296/190

[56] References Cited

U.S. PATENT DOCUMENTS 4,735,272 4/1988 Sjöström et al. ............... 180/89.14

FOREIGN PATENT DOCUMENTS

| 0081313 | 6/1983 | European Pat. Off. . |
| 0095633 | 12/1983 | European Pat. Off. ............ 296/190 |
| 0149810 | 7/1985 | European Pat. Off. ......... 180/89.14 |
| 0318438 | 5/1989 | European Pat. Off. ......... 180/89.14 |
| 2434499 | 2/1975 | Germany . |
| 3816094 | 11/1989 | Germany .................... 180/89.14 |
| 0026056 | 2/1982 | Japan .................... 296/190 |
| 0057071 | 4/1984 | Japan .................... 296/190 |
| 0454077 | 3/1988 | Sweden . |

Primary Examiner—Karin L. Tyson
Assistant Examiner—Peter C. English
Attorney, Agent, or Firm—Lerner, David, Littenberg, Krumholz & Mentlik

[57] ABSTRACT

An end stop arrangement for a cabin of a vehicle supported on a frame of the vehicle and movable between upper and lower end positions, wherein the frame has at least a lower abutment surface. The end stop arrangement includes a link arm having an upper abutment surface as well as first and second ends. The link arm is pivotally connected at the first end to the cabin and at the second end to the frame. A stop arm is connected to the cabin and extends in the direction of the frame. Damping elements are connected to the stop arm. The damping elements engage the lower abutment surface when the cabin is in the lower end position and the damping elements engage the upper abutment surface when the cabin is in the upper end position.

9 Claims, 7 Drawing Sheets

END STOP ARRANGEMENT FOR A VEHICLE CABIN

TECHNICAL FIELD

The present invention relates to an end stop arrangement for defining an upper end position and a lower end position of a vehicle cabin, which cabin is spring supported on a vehicle frame and tippable from a normal operating position to a displaced position.

BACKGROUND OF THE INVENTION

From SE-B-8503890-9 it is known to provide an end stop for a tippable vehicle cabin, which is spring mounted via link arms on the vehicle frame. The end stop consists of a rod with damping elements located on either side of an abutment flange on the frame. The known end stop is one example of a device which results in a limiting of the cabin's sprung movements, and in addition allows tipping of the cabin.

SUMMARY OF THE INVENTION

The object of the present invention is to obtain an end stop, which can be dimensioned for an optimal movement limiting without requiring provision for the tipping movements.

The above object is achieved in accordance with the present invention by an end stop arrangement for defining an upper end position and a lower end position of a vehicle cabin, which cabin is spring supported on a vehicle frame and tippable from a normal operating position to a displaced position, whereby the cabin is articulately connected to the frame by means of a link arm having a first end and a second end, said first end being pivotally supported in the frame and said second end being pivotally supported in a fixture on the cabin, wherein a stop arm extends from said fixture to an area below the link arm, said stop arm presenting damping elements for movement-damped abutment in said lower end position against a fixed lower abutment surface arranged on the frame, and in said upper end position against an upper abutment surface arranged on an underside of the link arm.

BRIEF DESCRIPTION OF THE DRAWINGS

The invention will now be described in more detail with reference to an embodiment and to the accompanying drawings, in which.

DETAILED DESCRIPTION OF PREFERRED EMBODIMENTS

Figure 1:
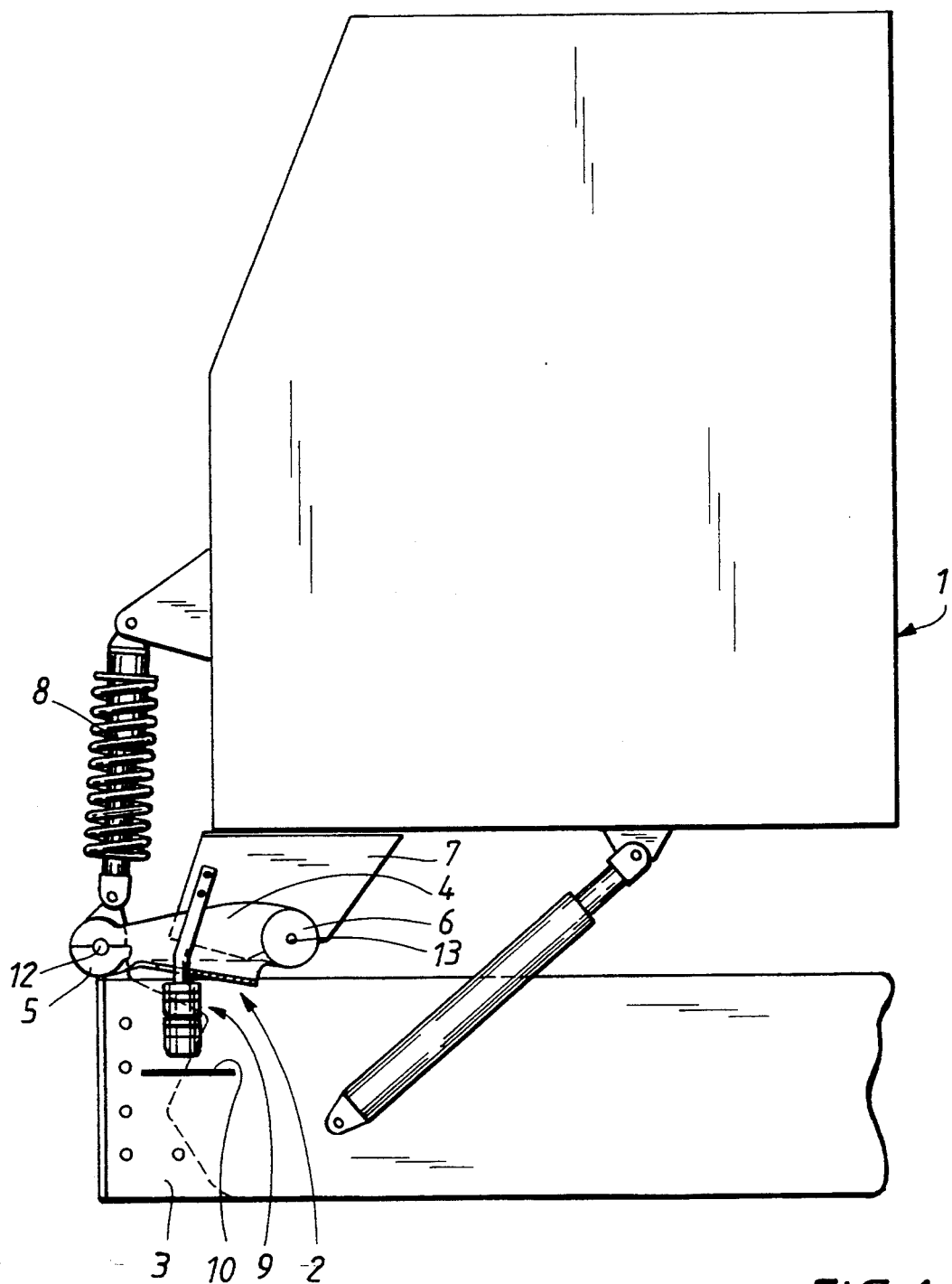
FIGS. 1–3 show schematically a suspension of a vehicle cabin with an end stop according to the present invention in different operating positions, whilst

The cabin suspension will first be described in its entirety with reference mainly to FIGS. 1, 2 and 3, in which a vehicle cabin 1 is schematically shown which is supported by a vehicle frame 3 via a link arm suspension 2. For the sake of clarity, only the cabin's front suspension is shown, whilst its rear suspension has been totally omitted. This can be of a per se conventional type with springs and shock absorbers in both the rear corners, whilst the front suspension 2 can likewise be arranged in each corner, i.e. the front corners of the cabin. In each corner the front suspension presents a link arm 4, whose one end 5 is pivotally supported on the frame 3 and whose rear end is pivotally supported in a fixture 7 on the cabin 1 in the form of a bracket for example. The cabin is supported by springs and shock absorbers be means of a combined spring- and shock absorbing unit 8, which is arranged in each of the front corners and is fixed between the cabin and the frame. The suspension further presents an end stop 9 which is arranged to limit the cabin's sprung movement between an upper and a lower end position. The end stop includes a lower abutment surface 10 on the frame which is formed from a plate projecting from said frame, also called the bump-stop plane. The end stop's other parts are described in more detail below with reference to FIGS. 5–8.

Figure 2:
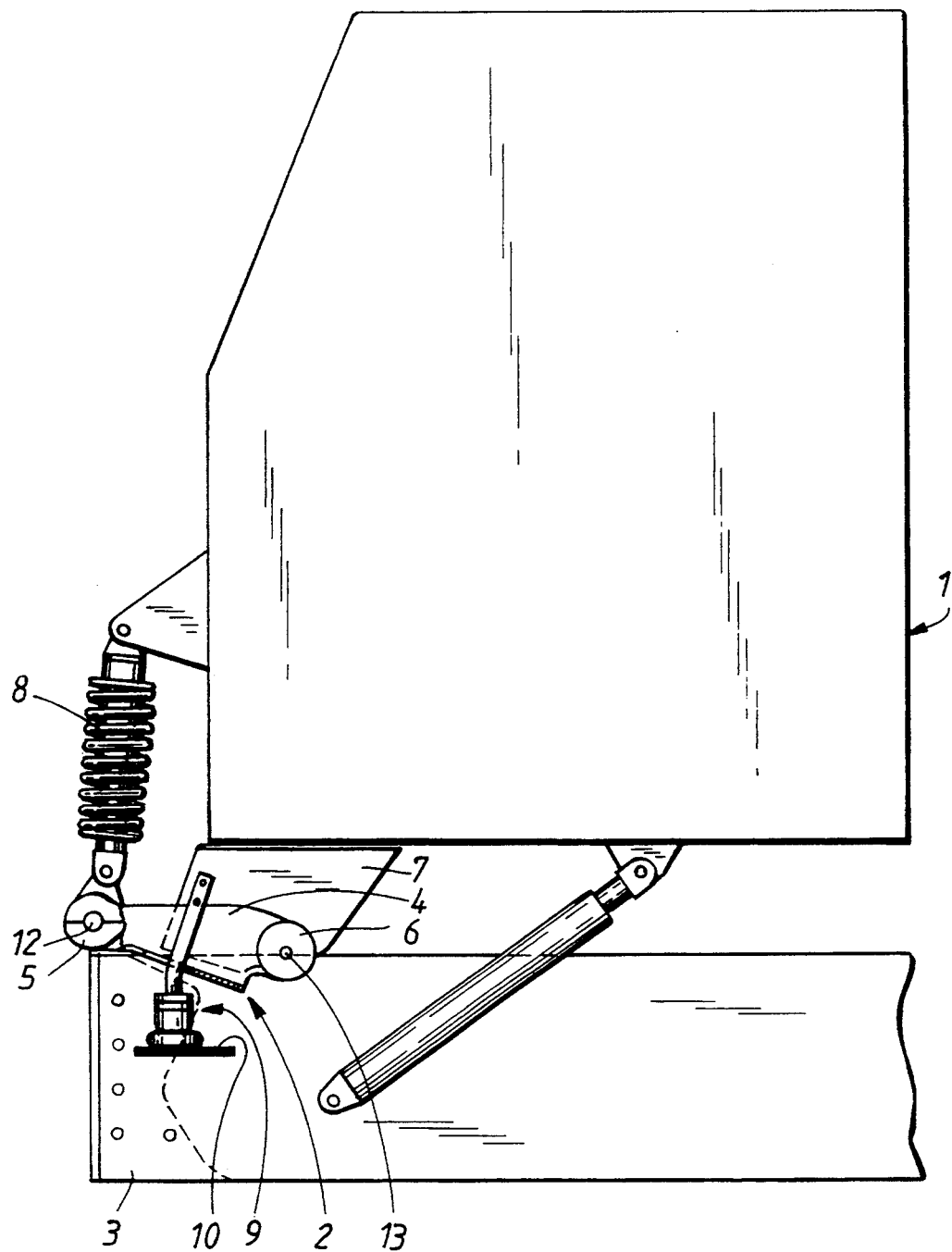
Figure 3:
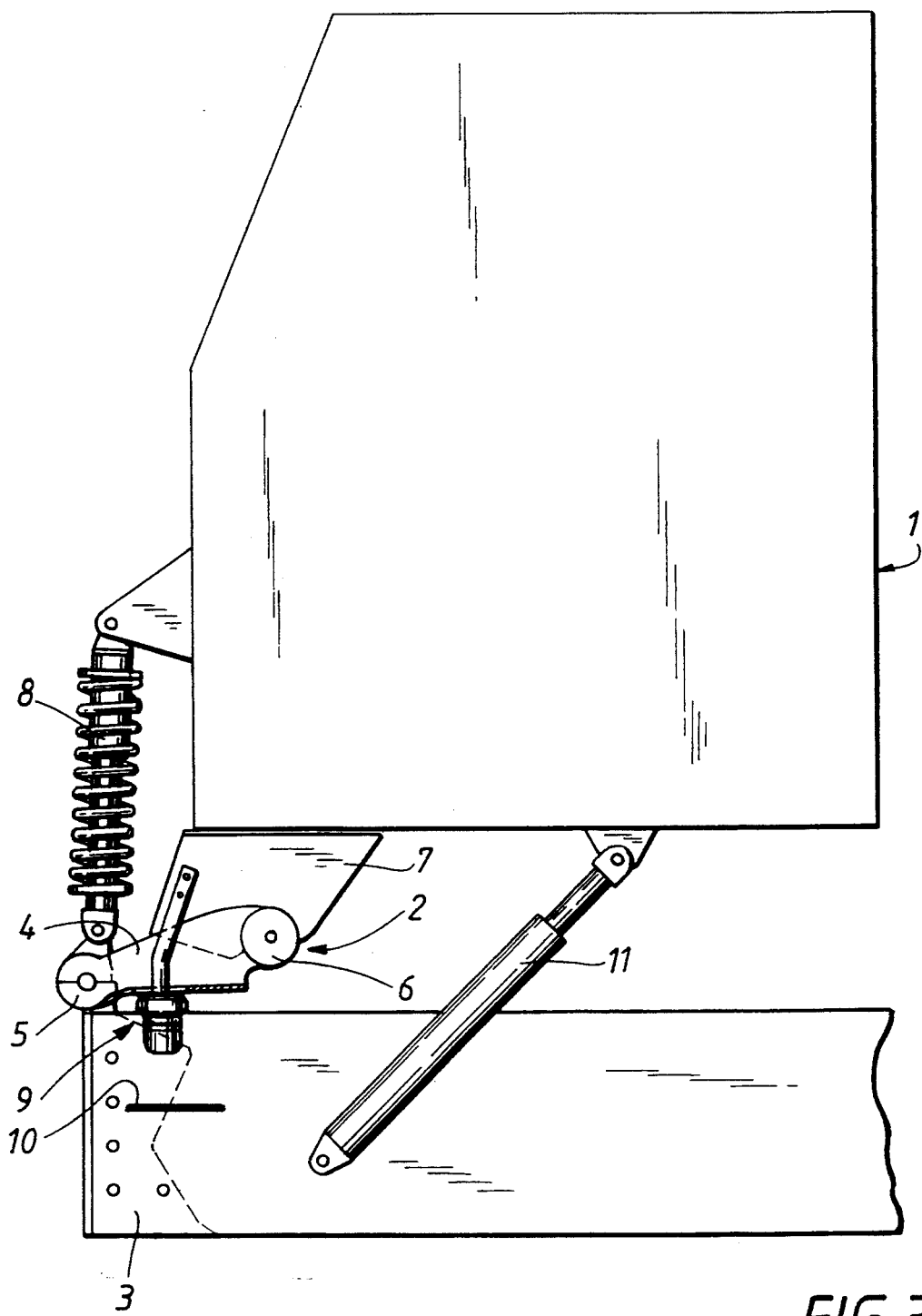
Figure 4:
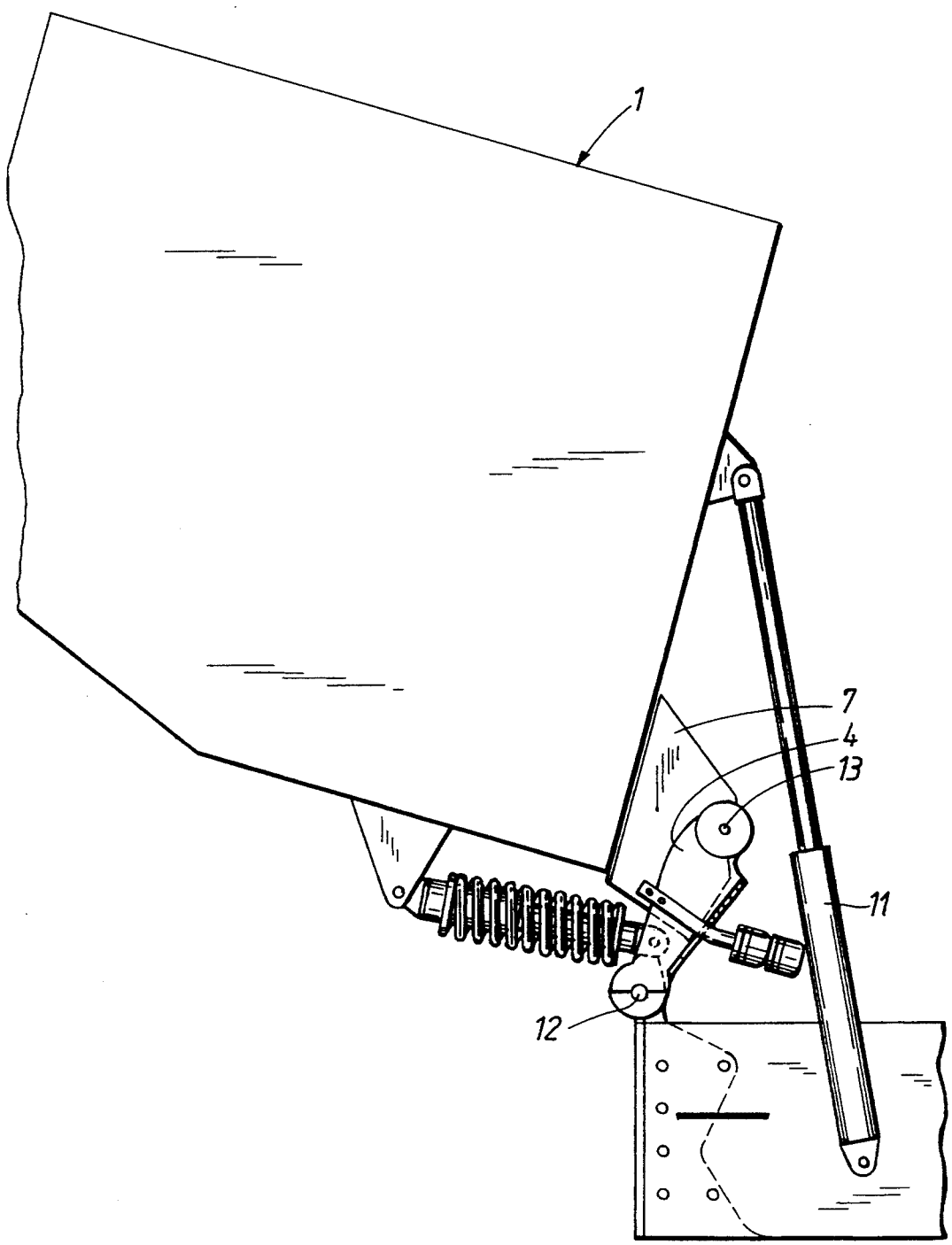
FIG. 4 shows the cabin in tipped position.
Figure 5:
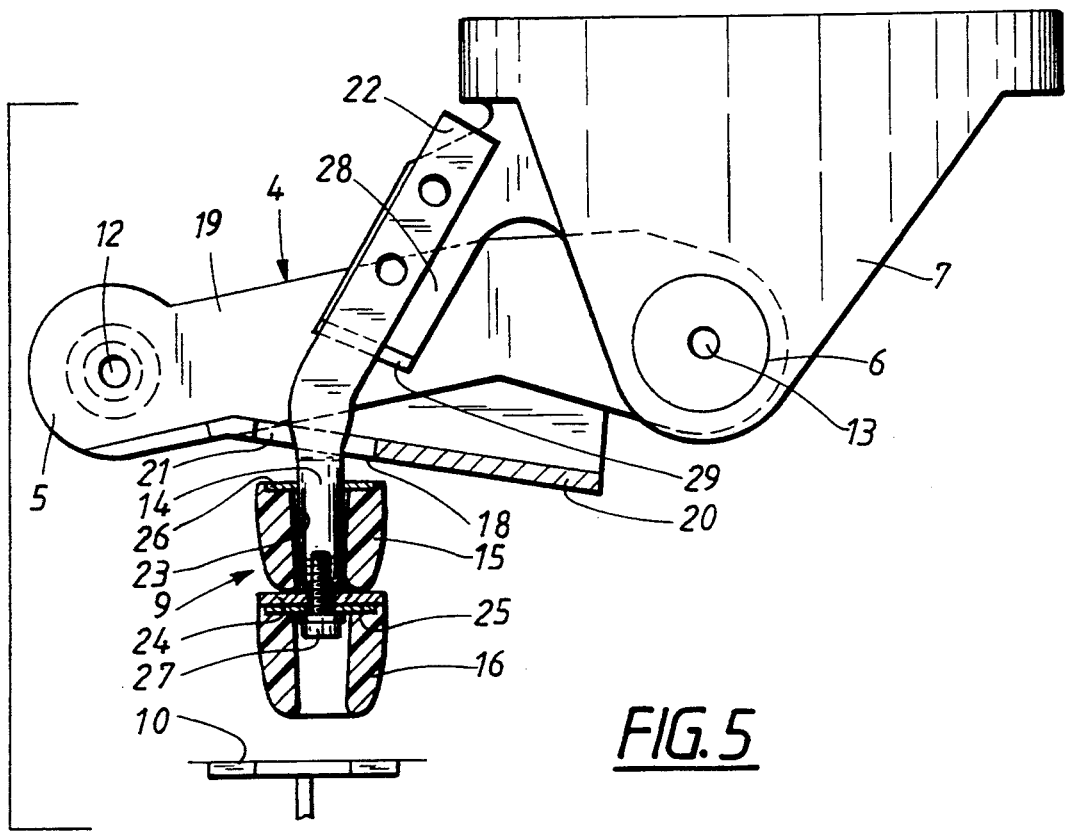
FIGS. 5–7 show, on an enlarged scale, a longitudinal section through the cabin suspension with the end stop according to the invention in different operating positions, whilst

Of the different possible positions for the cabin and its suspension, FIG. 1 shows an intermediate position, in which neither of the end positions has been reached, FIG. 2 shows a lower end position for the cabin and its suspension relative to the frame, which is also called the bump stop position, whilst FIG. 3 shows the cabin's upper end position relative to the frame, which is also called the rebound position. A tip cylinder 11 accompanies its movements without having any appreciable effect, said cylinder 11 being attached between the frame 3 and the cabin at a distance from the front suspension. FIG. 4, on the other hand, shows the tip cylinder 11 activated for expansion and also tipping of the cabin 1 around both of the link arm's 4 two axes 12, 13, which will be described in more detail below.

The construction and operation of the link arm suspension and the end stop 9 will be described in more detail with respect to FIGS. 5–8. The end stop 9 presents a stop arm 14 which is foreseen with two damping elements 15, 16 for damped abutment both against the lower abutment surface 10, arranged on the frame and against an upper abutment surface 18 on the link arm 4. FIGS. 5–8 depict a central longitudinal section through the link arm 4 and thus only one half of this is shown. In this shown example the link arm consists namely of two link arm parts 19, of which only one can be seen. Both link arm parts 19 extend from respective sides of an intermediate joining wall 20 and are given the form of a U-shaped channel. The joining wall 20 thus forms a bottom in the channel, which presents an opening 21, through which the stop arm 14 extends. The stop arm, 14 at its upper end 22, is fixedly attached to the cabin fixture 7 and at this end is advantageously in the form of a sheet for the sake of stability, whilst its part below the link arm's joining wall is rod-formed in the shown example. A corresponding open cavity 23 is presented by each of the damping elements 15, 16, whereby the stop arm 14 extends through the upper damping element 15. In the stop arm's 14 lower end there is arranged a stationary counter-stay 24 in the form of a plate fixedly screwed into the stop arm. The damping elements 15, 16 are formed from an elastomer, each with a fixed washer 25, 26. The upper damping element's 15 washer 26 forms the damping element's contact surface against the upper abutment surface 18, whilst the lower damping element's 16 washer 25 forms a fastening element for fastening of the damping element by means of a screw 27.

Figure 6:
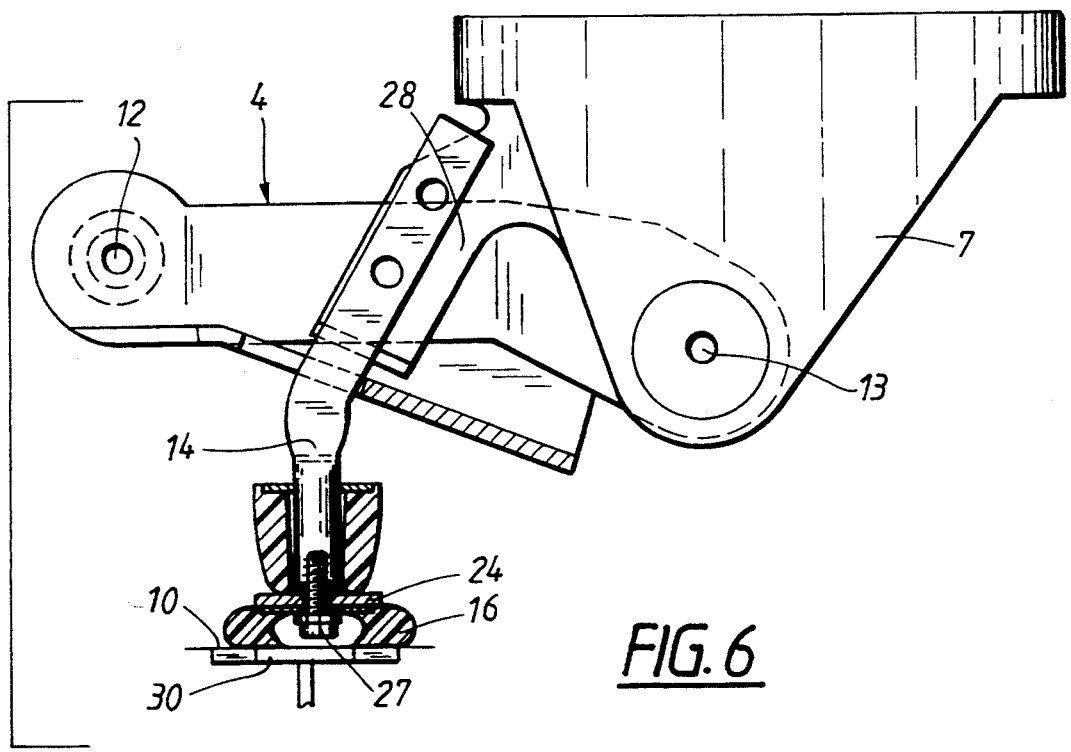

The stop arm 14 is fixed to a projection 28 which sticks out from the cabin bracket 7, said projection being formed at its lower end with an additional end stop 29, for example in the form of a lateral angled part. This end stop 29, as is shown in FIG. 6, is so positioned that it is inoperative during the cabin's normal sprung movements and serves only as a tipping abutment, which will be described in more detail below.

The suspension of the vehicle cabin 1 is so formed that movements in the frame 3, depending on the unevenness of the road, will be transmitted to the cabin in as small a degree as possible, implying that the variations of the frame in the vertical direction cause corresponding vertical variations at the end 5 of the link arm 4, whilst the link arm undergoes substantially a pivotal movement around the axis 13 at the opposite end. As seen from FIGS. 1 and 5, an articulate movement of the link arm inside a limited angular range is normally allowed, without the damped end stop according to the invention being activated. These moderate articulate movements are damped exclusively by the cabin's other shock absorbers. On an upwardly directed jerk movement to the frame exceeding said moderate movements, an articulate movement occurs at the link arm 4 around the axis 13 such that the stop arm 14 with the lower damping element 16 is brought into contact with the abutment surface 10 which itself is moving upwardly with the frame, whereby the lower damping element will abut, under elastic deformation, against the abutment surface and the so called bump stop occurs. The link arm's articulate movement is stopped thus in a damped manner with the damping element 16 deformed between the counterstay plate 24 and the abutment 10 which in the shown example is formed with a hole 30 in order to accommodate the screw 27 head during considerable deformation. As mentioned above, the tipping abutment 29 is so positioned that it does not come into contact with any of the link arm 4 surfaces.

Figure 7:
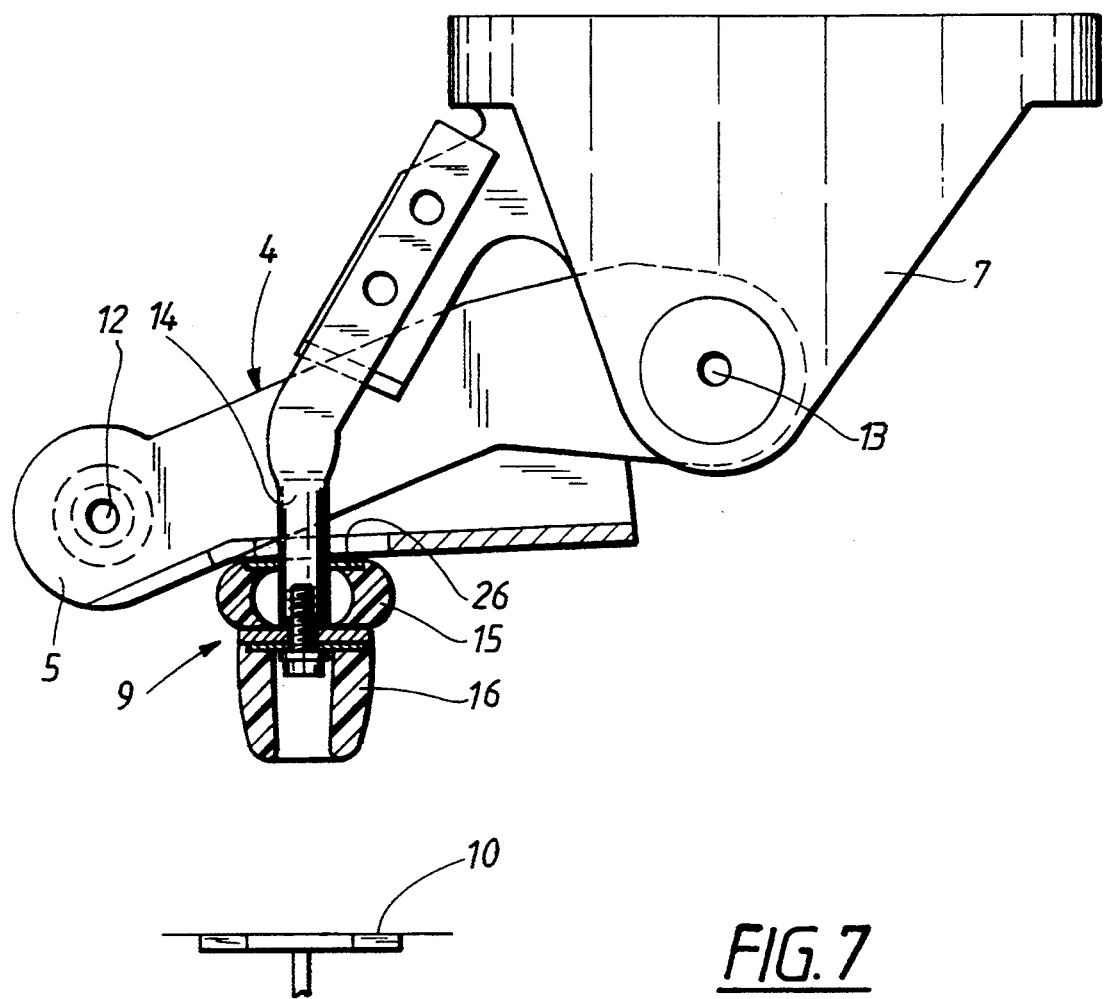

Upon an oppositely directed articulate movement of the link arm 4 around the axis 13, exceeding the above mentioned moderate movements, the link arm's end 5 is lowered, whereby the stop arm will be moved upwardly until the upper damping element 15 abuts with its abutment element 26 against the underside of the joining wall 20 and due to deformation forms a damped abutment in the cabin's upper end position relative to the frame, i.e. rebound position, see FIGS. 3 and 7.

Figure 8:
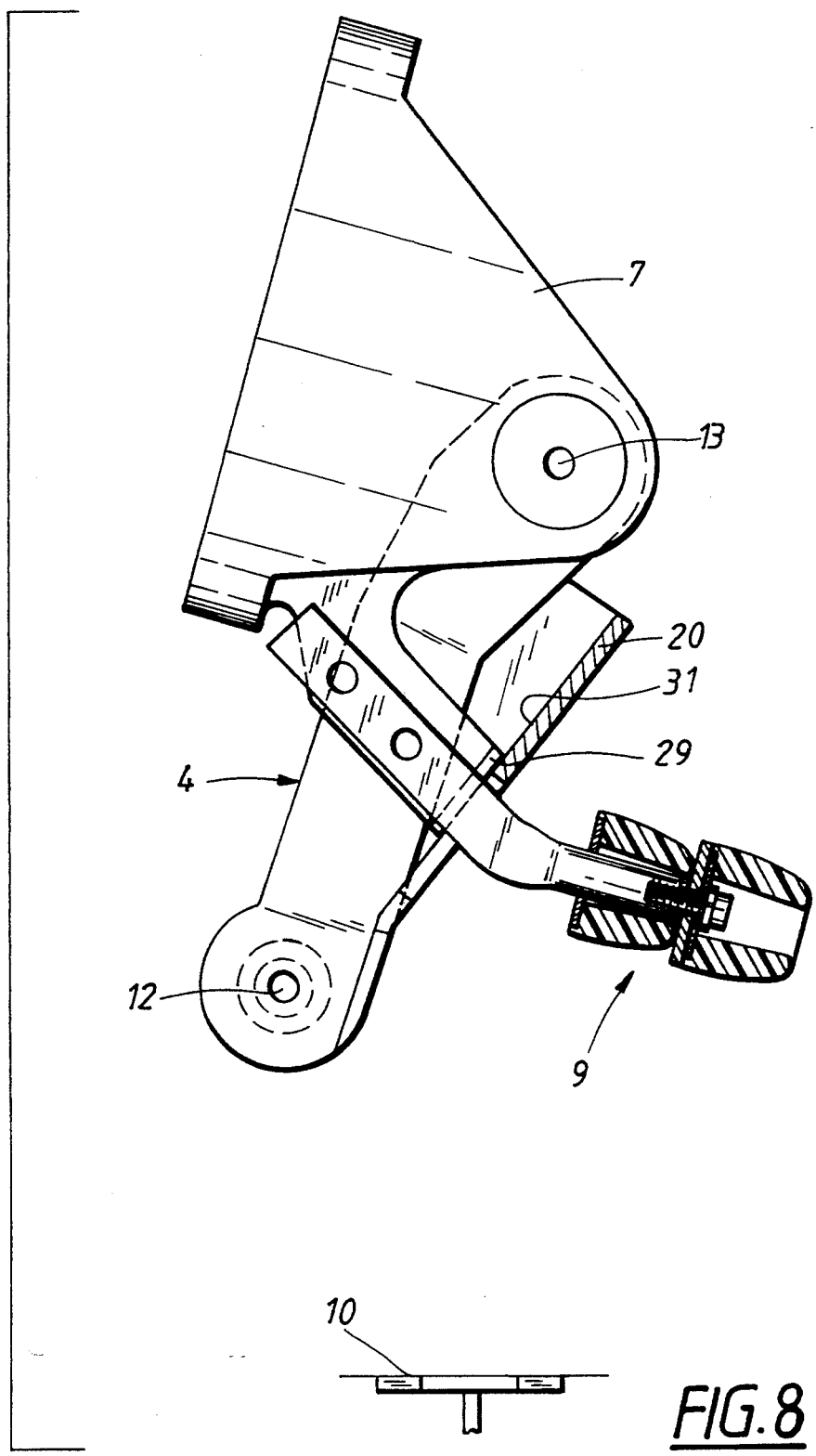
FIG. 8 shows the suspension with a tipped cabin.

On tipping of the cabin 1 by activating the tip cylinder 11, firstly an articulation of the cabin and its fixture 7 occurs about the axis 13 during which the link arm is held essentially motionless, until the tipping abutment 29 abuts with its abutment surface against the joining wall's 20 upper side 31 which forms a stop surface for the end stop 29, see FIG. 8. Thereby the relative articulate movement between the cabin fixture 7 and the link arm 4, which instead is made to pivot around its axis 12 into the tipped position shown in FIGS. 4 and 8, is maintained for example by the tipping cylinder 11 in its expanded end position. Thus in the tipped position none of the sprung movement damping, end stop abutment elements 15, 16 is loaded, i.e. deformed, which has a very favourable effect on the elements' lifespan. Through choice of end position it is ensured that counter-acting torques are maintained on both the link arm 4 and the cabin fixture 7, so that the tipping abutment 29 does not leave its abutment position in the cabin's tipped condition. Tipping back occurs in a corresponding way but inversely with a return pivoting or the cabin together with the link arm 4 until the combined spring and shock absorber unit 8 overcomes the torque applied to the cabin by the tipping cylinder 11 and the link arm stops and a rotating movement occurs between the cabin fixture and the link arm, so that the tipping abutment 29 leaves its abutment position and takes up the free position shown in FIGS. 1 and 5.

The invention is not limited to the embodiments described above and shown in the drawings, but can be varied within the scope of the following claims. For example the link arm 4 can be of a simple type with an abutment edge on its lower side instead of the joining wall 20, against which the upper damping element 15 can abut. Both damping elements can be replaced by a single integrated element with a central secure attachment in the stop arm 14.

We claim:

1. An end stop arrangement for a cabin of a vehicle, said cabin supported on a frame of said vehicle and being movable between upper and lower end positions, said frame having at least a lower abutment surface, said end stop arrangement comprising
   a link arm having an upper abutment surface as well as first and second ends, said link arm being pivotally connected at said first end to said cabin and at said second end to said frame;
   a stop arm connected to said cabin and extending in the direction of said frame; and
   damping elements connected to said stop arm, whereby said damping elements engage said lower abutment surface when the cabin is in said lower end position and said damping elements engage said upper abutment surface when the cabin is in said upper end position.

2. The arrangement as claimed in claim 1, wherein said cabin is spring supported on said frame of the vehicle.

3. The arrangement as claimed in claim 2, wherein said stop arm extends under said link arm.

4. The arrangement as claimed in claim 3, wherein the link arm comprises two spaced apart link parts, each said link part extending from said first end to said second end, said link parts are inwardly connected by means of a joining wall having an underside, wherein a region of said underside forms said upper abutment surface.

5. The arrangement as claimed in claim 4, wherein the joining wall has an opening surrounded by edge regions and the stop arm extends through said opening, whereby said edge regions form said upper abutment surface.

6. The arrangement as claimed in claim 3, wherein the stop arm has a lower end and an upper end, with said lower end supporting a fixed counterstay having an upper side and a lower side, and wherein said damping elements comprise a first damping element attached to said upper side of said counterstay, and a second damping element attached to said lower side of said counterstay.

7. The arrangement as claimed in claim 6, wherein a portion of the stop arm situated under the link arm has the form of a rod, said counterstay is formed by a plate positioned at said lower end of said rod, said damping elements are formed as elastomeric bodies, and said first damping element has a hole going therethrough, and said rod extends through said hole.

8. The arrangement as claimed in claim 3, wherein an additional end stop extends from the cabin, said additional end stop abuts against a surface of the link arm upon movement of the cabin.

9. The arrangement as claimed in claim 3, wherein an additional end stop extends from the stop arm, said additional end stop abuts against a surface of the link arm upon movement of the cabin.

* * * * *